United States Patent [19]

Kolbenson et al.

[11] Patent Number: 5,594,727
[45] Date of Patent: Jan. 14, 1997

[54] TELEPHONE SWITCH PROVIDING DYNAMIC ALLOCATION OF TIME DIVISION MULTIPLEX RESOURCES

[75] Inventors: Chuck Kolbenson, North Andover; Paul Nelson, Georgetown, both of Mass.; Kenneth St. Hilaire, Hollis; Alan Tingley, Salem, both of N.H.; Gerry Tenuta, Burlington, Mass.; Peter Sandstrom, Sanbornton, N.H.

[73] Assignee: Summa Four, Inc., Manchester, N.H.

[21] Appl. No.: 308,135

[22] Filed: Sep. 19, 1994

[51] Int. Cl.$^6$ ........................................... H04J 3/16
[52] U.S. Cl. .............................................. 370/442; 370/468
[58] Field of Search .................................. 370/58.1, 58.2, 370/79, 95.3, 85.7, 95.1

[56] References Cited

U.S. PATENT DOCUMENTS

| | | | |
|---|---|---|---|
| 4,187,399 | 2/1980 | Maxfield et al. | 370/85.7 |
| 4,965,798 | 10/1990 | Mostafa et al. | 370/79 |
| 5,136,581 | 8/1992 | Muehrcke | 370/58.1 |
| 5,305,312 | 4/1994 | Fornek et al. | 370/79 |
| 5,307,347 | 4/1994 | Duault et al. | 370/85.7 |

Primary Examiner—Douglas W. Olms
Assistant Examiner—Min Jung
Attorney, Agent, or Firm—Cesari and McKenna

[57] ABSTRACT

A switch, which connects ports on a customer port module to ports on a network port module via time slots on a time division multiplexing bus, determines for each connection a number of required time slots, based on the current switch configuration and/or the signal traffic at the associated port. The switch then determines if it has the required number of time slots available generally and if it can make the time slots available to the port. If so, the switch assigns the time slots to the port and completes the connection. The switch determines the number of time slots required by consulting a stored port type indicator table, which lists bandwidth demand based on port type, or by detecting in-band signaling information that indicates the bandwidth demand. If the table indicates that the switch includes non-blocking ports, the switch coordinates the number of time slots allocated to a connection with the number of slots required to be kept free for the non-blocking ports. The switch may thereafter dynamically allocate time slots to the connection, based on signal traffic. The switch may be reconfigured at the request of a customer, by updating routing and port type information stored in the switch. Also, control circuitry in the switch may initiate a reconfiguration, based on signal traffic.

28 Claims, 9 Drawing Sheets

TELEPHONE SWITCH PROVIDING DYNAMIC ALLOCATION OF TIME DIVISION MULTIPLEX RESOURCES

FIELD OF THE INVENTION

This invention relates generally to telephone switches and, more particularly, to switches that operate with time division multiplexed buses.

BACKGROUND OF THE INVENTION

A number of different types of equipment may be used efficiently to carry telephone signal traffic by combining or "multiplexing" the signals from several telephone lines and transmitting the signals at a faster rate over a single, high-speed line. These devices accept a number of different voice or data signals at a low bandwidth and produce a time division multiplexed output signal, typically in digitized form, having a higher bandwidth. For example, one commonly used signal format for digital multiplex transmission is known as a T1 span.

Multiplexed signaling is of particular interest to businesses and other high volume customers of telephone services. For example, interexchange carriers (IXCs), such as AT&T, MCI, and Sprint, offer their customers favorable tariffs for subscribing to various types of digital multiplex services that utilize a multiplexed line such as a T1 span. In a typical configuration, the customer sends signals over so-called DS0 or sub-DS0 rate telephone lines to the input ports of a multiplexer located, for example, at a central office of the local telephone service provider. The multiplexer combines the signals on these relatively low bandwidth incoming lines, by time division multiplexing, and provides a multiplexed output signal. It then sends this output signal over one or more high bandwidth connections, such as a T1 span, to the public switched telephone network, a data network, or leased lines. These multiplexed signals may be voice or data, and may include DS1, DS3, packet data, frame relay, or video signals.

The various types of multiplexer devices in current use include integrated access devices (IADs), channel banks, and digital access cross-connect systems (DACS). Each of these multiplexer devices handle both voice band and data signals. The channel banks are typically used for voice band signal multiplexing, IAD devices for a mix of voice band and data signal traffic, and DACS for "nailed up" voice band or data services.

Each of the multiplexer devices connect a number of distinct, physical lines to specific network services. For example, the device may connect one-third of the lines from the customer equipment to network lines that send and receive voice rate signals, some locally and some long distance, and two-thirds of the lines to network lines that handle the faster data transfers. These devices make efficient use of the network services by sending to them appropriate signals from the customer equipment. By selectively connecting equipment on the customer's premises to lines that are routed through one of these devices to the particular network services, the customer can essentially configure how outbound traffic from its equipment is applied to the network. For example, the customer may connect its telephones to lines that connect, through an IAD, to a network of voice rate lines and its modems and facsimile machines to lines that connect, through the IAD, to a network of data rate lines.

The multiplexing devices may be installed at the central office of a telephone service provider, as discussed above, or they may be installed at a customer's premises, to service that customer and/or a number of customers in the same building or complex of buildings. These end office devices are, however, typically owned and controlled by the service provider.

In order to change the configuration of the multiplexing device, that is, to connect a given subset of the customer's lines to different types of network services, the multiplexing equipment must be reprogrammed. This typically requires that the customer notify the service provider, and the service provider perform the re-programming to provision the requested service. Such a reconfiguration may even require the installation of new hardware at the service provider's central office, for example, to increase the number of lines that ultimately connect to the network data services. Accordingly, such changes to the device's configuration are not immediate and may be quite costly.

Changing the mix of voice and data connections at the IAD solves one problem, it connects selected customer equipment to established connections to network services. It does not, however, address the problem of changing the connections between the IAD and the various network services.

Unless the customer is willing to pay the cost of a permanent, or "nailed-up" connection through the central office of the local service provider, the customer's access to the network is typically made through a switch in the central office. The switch makes an association between the physical ports, or lines, coming from the IAD on the slow customer side and time slots associated with the high speed, network side. Thus, there is a "mapping" of the switch input ports to time slots. This mapping is essentially programmable, so that it can accommodate changes to a customer's service contract, i.e., the addition or deletion of network services from that contract. However, in prior known systems, this re-programming involves manual manipulation of the switch connections. The reconfiguration is thus both costly and time consuming.

The way that telephone systems have evolved over time, a customer is typically constrained to consolidating its voice traffic onto a Private Branch Exchange (PBX) or "legacy" system, and its data traffic onto one or more data networks dedicated to handling data services. Accordingly, the customer is paying for the two or more different types of independent connections into the PSTN and/or other telephone networks, although not all of the available capacity of any of these connections may be used all of the time.

For example, during the day a business customer may require a certain number of DS0 or sub-DS0 rate lines for voice traffic. At night, these voice lines are typically idle, and the customer may need instead to use high-speed data services, to transfer data, such as the day's sales receipts, to another location. This customer must thus maintain the unused voice line connections during the night and the unused data line connections during the day. One option is switched services, but this can be expensive for high rate data services. What is needed is a switching device that can be dynamically reconfigured to assign appropriate network connections, i.e., voice or data network connections, to lines originating from the customer equipment.

The customer may also temporarily require extra bandwidth at various times. For example, the customer may desire to hold a video teleconference, which requires the concurrent use of several lines. To handle such teleconferences using prior known systems, the service providers allow a customer, by prior arrangement, to request that several lines be essentially tied, or "bonded," together. During the pre-arranged conference the service provider connects the customer to the requisite number of lines through the switch. If the customer exceeds the allotted bandwidth, the service provider typically does not accommodate the excess signal traffic and signals may be lost. Further, the bonding service is only available at the pre-arranged times. These systems thus can not accommodate unscheduled or impromptu teleconferences. What is needed is a switch that dynamically allocates to the customer lines, as needed, appropriate bandwidth, i.e., an appropriate number of time slots.

SUMMARY OF THE INVENTION

The invention is a multiple access time division multiplexing switch that can be dynamically reconfigured. The reconfiguration can be initiated by the customer or by the switch. The switch treats time slots essentially as a switch resource that can be dynamically allocated among the various customer lines, that is, among the switch ports. These allocations are based on the current configuration of the switch, and/or on the signal traffic through the various ports.

Specifically, the time division multiplex switch determines the bandwidth required by a particular port and the number of time slots required to support that bandwidth. It then determines if the required time slots are available to that port. If the time slots are available, the switch dynamically allocates them to the port. For duplex connections the switch also allocates the required number of time slots to the associated output port, to handle each direction of the connection.

The switch determines the bandwidth demand of a port in several ways. Briefly, the current switch configuration may dictate the bandwidth of certain ports. For other ports, the customer may dynamically manage the bandwidth by providing bandwidth information in-band, i.e., within the signal sent to the port. For example, certain protocols, such as the Multirate Integrated Services Digital Network, provide a field in the formatted signal for the bandwidth information. Alternatively, information relating to bonding may be implicitly provided by the dialed digits of the originating signal.

The switch may dynamically adjust the bandwidth allocation of established connections, as necessary. For example, the switch may autonomously assign additional time slots to a port, to handle data that is arriving at the port at a rate that exceeds the rate at which the currently allocated time slots can accommodate the data. The switch also buffers the data, so that they are not lost before the additional time slots are available to the port. The customer thus need not slow its transmission rate to accommodate the network connection.

Whenever a need for increased bandwidth exists, the network connections on the output side of the switch may also be dynamically changed. If, for example, the time slots of a T1 span on the network side are busy, and are thus unable to handle a new call, control circuits in the switch may request that an additional T1 span be allocated on the network side or that the call be routed to the network through an alternative route that is then available. The switch and the host computer can thus essentially dynamically reconfigure the connections through the switch and to the network.

Further, the customer may, at any time, request that the switch be reconfigured. The customer sends such requests to the switch, over a separate telephone line, or over a control channel, at times not associated with call set-up. For example, the customer may dial into the service provider's host computer and request, via a menu, that various lines be connected to a particular data service. The host computer and the switch then communicate over the control channel, and perform the necessary handshake routines to establish the desired configuration. Alternatively, the customer may send configuration information directly to its IAD. The IAD then communicates with the switch over the control channel, again at times not associated with call set-up, and the switch communicates with the host computer, to establish the requested configuration.

The switch provides distinct advantages to the local service provider and to the interexchange carrier (IXC), also. First, it acts as a seamless gateway between the customer's private network and the public carrier network. From the IXC's point of view, the switch provides an additional isolation layer between the customer and the IXC's equipment, thereby encouraging service efficiency through traffic aggregation. The ability to provide customer-initiated reconfiguration and provisioning also greatly enhances the attractiveness of an IXC's offerings, since the customer can take full advantage of each of these offerings.

The switch gives local service providers, such as the regional bell operating companies, the advantage of offering to the customer a mix of service offerings, by making them available from multiple IXC's on a single access link. For example, a customer may subscribe to a frame relay service provided by Sprint, long distance voice service provided by MCI, and a fractional T1 connectivity service provided by AT&T, all with a single T1 connection between the customer and the local service provider. Thus the customer need not pay for separate connections to the various networks.

BRIEF DESCRIPTION OF THE DRAWINGS

For a fuller understanding of the nature of the advantages of the invention, reference should be made to the following detailed description together with the accompanying drawings, in which.

DETAILED DESCRIPTION OF A PREFERRED EMBODIMENT

Figure 1:
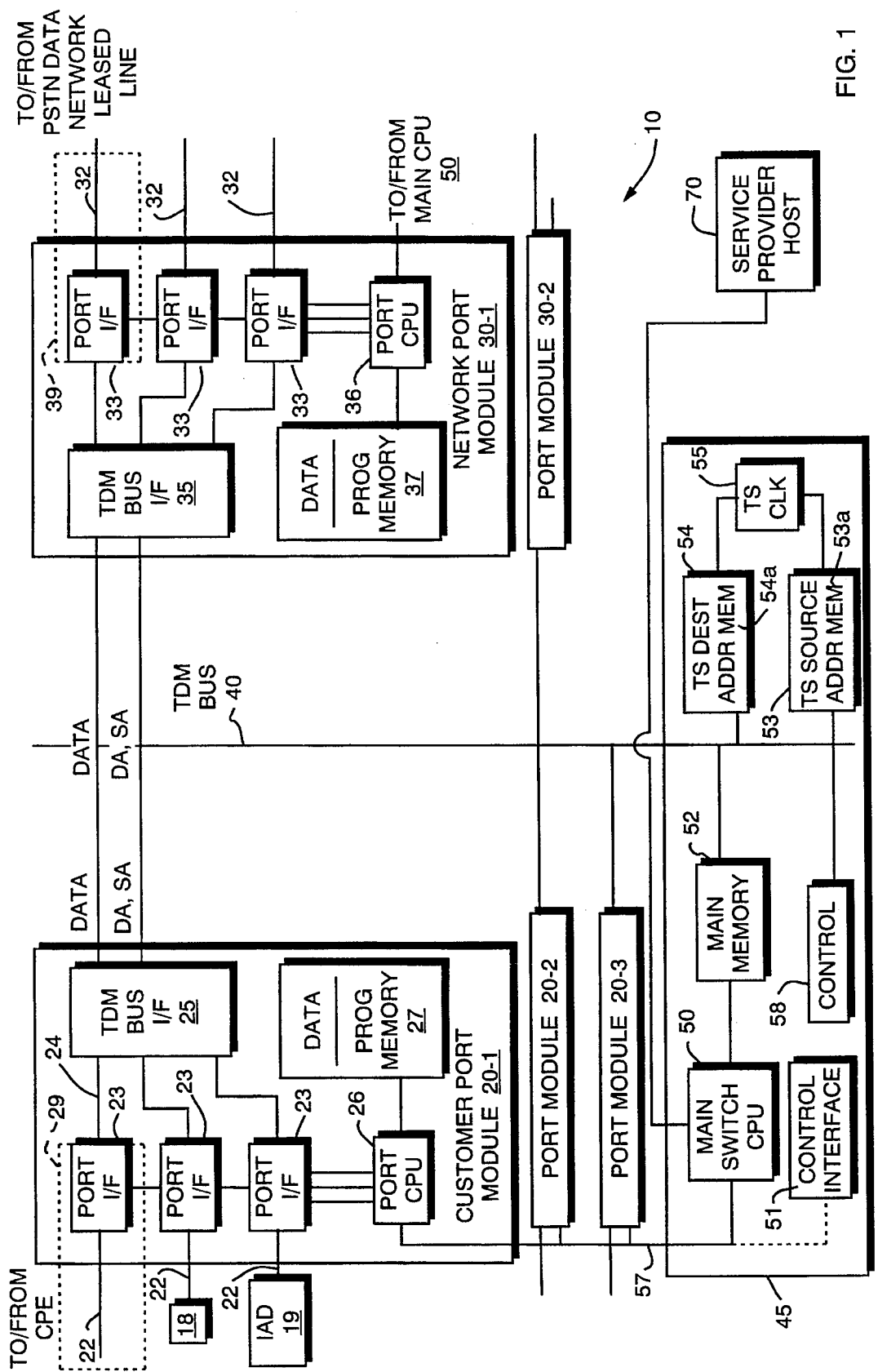
FIG. 1 is a block diagram of a time division multiplex switch constructed in accordance with the invention.

FIG. 1 is a block diagram of a time division multiplexing (TDM) switch 10 incorporating the various features of the invention. The switch 10 aggregates signal traffic by combining a number of telephone lines 22 originating from a customer's equipment 18 or from a network of one or more customers' equipment through an IAD 19, referred to collectively as Customer Premise Equipment (CPE). It then sends these signals onto one or more lines 32 that connect to the Public Switched Telephone Network (PSTN), to a data network or to leased lines. The switch 10 provides this function via a series of customer port modules 20-1, 20-2, . . . (collectively customer port modules 20) and network port modules 30-1, 302 . . . (collectively network port modules 30) interconnected by a TDM bus 40.

An exemplary customer port module 20-1 is connected to a sub-set of the customer lines 22. These lines 22 may include the standard telephone-rate, so-called DS0 rate, lines, multiple sub-rate DS0 lines, or various types of aggregated lines such as DS1 rate, Multirate Integrated Services Digital Network lines, or high-speed video lines.

Each line 22 connects to the switch 10 through a customer interface circuit 23. These circuits 23 may handle a single line 22, or multiple lines 22 that are of the same type.

Each of the customer port interface circuits 23 converts the incoming signals from associated line 22 to a format that is suitable for transmission through the remainder of the switch 10. In the preferred embodiment, the switch 10 uses a digital data format for the switching fabric, and the customer port interface circuit 23 performs analog to digital (A/D) conversion and protocol conversion, as required. This formatted data is then sent over an associated customer port connection line 24 to a TDM bus interface circuit 25. Signaling information goes over a separate bus 57, as discussed in more detail below.

The customer port interfaces 23 are bi-directional. Thus, they also accept formatted data from the TDM bus interface 25 over lines 24 and convert the data to the appropriate form for transmission back to the CPE over the customer lines 22. Each of the customer port interfaces 23 and the associated customer lines 22 is referred to herein as a customer port 29.

The TDM bus interface 25, which is also bi-directional, formats, buffers and successively places data from the individual customer ports 29 on the TDM bus 40. In the preferred embodiment, the data are placed on the TDM bus 40 in time slots that accept multiples of 8-bit PCM (serial or parallel) data bytes. When data are removed from the bus 40, the TDM bus interface 25 converts the data to a format that is suitable for the port interfaces 23. Although only one TDM interface 25 is shown as serving the N customer port interfaces 23, it should be understood that multiple TDM bus interface circuits 25 may be needed in each customer port module 20.

The network port modules 30 are essentially identical to the customer port modules 20. An exemplary network port module 30-1 includes network port interfaces 33, which are associated with network lines 32. These lines 32 or a subset of them are coupled to the PSTN, to one or more data networks and/or to leased lines. Each network port module 30 also includes a bi-directional TDM bus interface 35, which transfers signals to and receives signals from both the TDM bus 40 and the network port interfaces 33. Each of the network port interfaces 33 and the associated network lines 32 is referred to herein as a network port 39.

Access to the TDM bus 40 is time division multiplexed. As is conventional, each customer port 29 and each network port 39 is assigned a unique address, to facilitate data transfer over the bus 40. To grant, for example, customer port interface 23 access through the switch 10 to a particular network port 33, the address of port 23 is asserted as a source address associated with a time slot that is allocated to the connection and the address of network port 33 is asserted as a destination address associated with the same time slot. The appropriate customer port module 20 and network port module 30 respond in a conventional manner to the asserted addresses, and the TDM bus interfaces 25 and 35 transfer data to or remove data from the bus 40, as appropriate.

Each of the customer port modules 20 also includes a port CPU 26 and a memory 27. The CPU 26, in accordance with information stored in the memory 27, generates the appropriate control information to transfer data between the TDM bus interface 25 and the customer port interfaces 23.

A switch controller 45 includes a main CPU 50, which is responsible for signaling, coordinating access to the TDM bus 40 and managing the activities of each of the port modules 20. This processor communicates with a service provider host computer 70 that manages customer service information, such as the total bandwidth available to a particular customer under the terms of its service contract. The module control processor CPU 50 also connects directly, or via a control interface 51, to the bus 57 over which it sends to each of the port CPUs 26 or receives from them signaling and control information. The main CPU 50 is also connected to a main memory 52, the contents and function of which will be described in greater detail below with reference to FIG. 2.

The main CPU 50 controls time slot address generation by controlling in a conventional manner the operations of a time slot source address generator 53, a time slot destination address generator 54 and a time slot clock circuit 55. The main CPU 50 writes into a memory 53a in the time slot source address generator 53 information that indicates the desired sequence of connections through the switch 10. The source address generator 53 then provides a series of source addresses (SA) that indicate the order in which the modules are permitted to place data on the TDM bus 40. In some instances, destination address generator 54 also stores information that indicates the desired sequence of destination connections. The destination address generator 54 then provides a series of destination addresses (DA), which indicate the order in which the modules are permitted to remove data from the TDM bus 40.

The time slot clock generator 55 also operates in a conventional manner to provide a clock to control and synchronize the operations of the two address generators.

Unlike prior art time division multiplexing switches, however, the illustrated switch 10 contains no permanent assignment of time slot capacity to a given physical port 29 or 39. The switch 10 assigns time slots based on the current switch configuration and then may autonomously and dynamically adjust the number of time slots allocated to a particular connection to handle changing bandwidth needs, as discussed below with reference to FIGS. 3, and 7 and 8, respectively. Further, the aggregate (and statistical) time slot capacities associated with a particular port may be changed at any time under switch control, at the request of the customer, as discussed below with reference to FIGS. 9 and 10.

Figure 2:
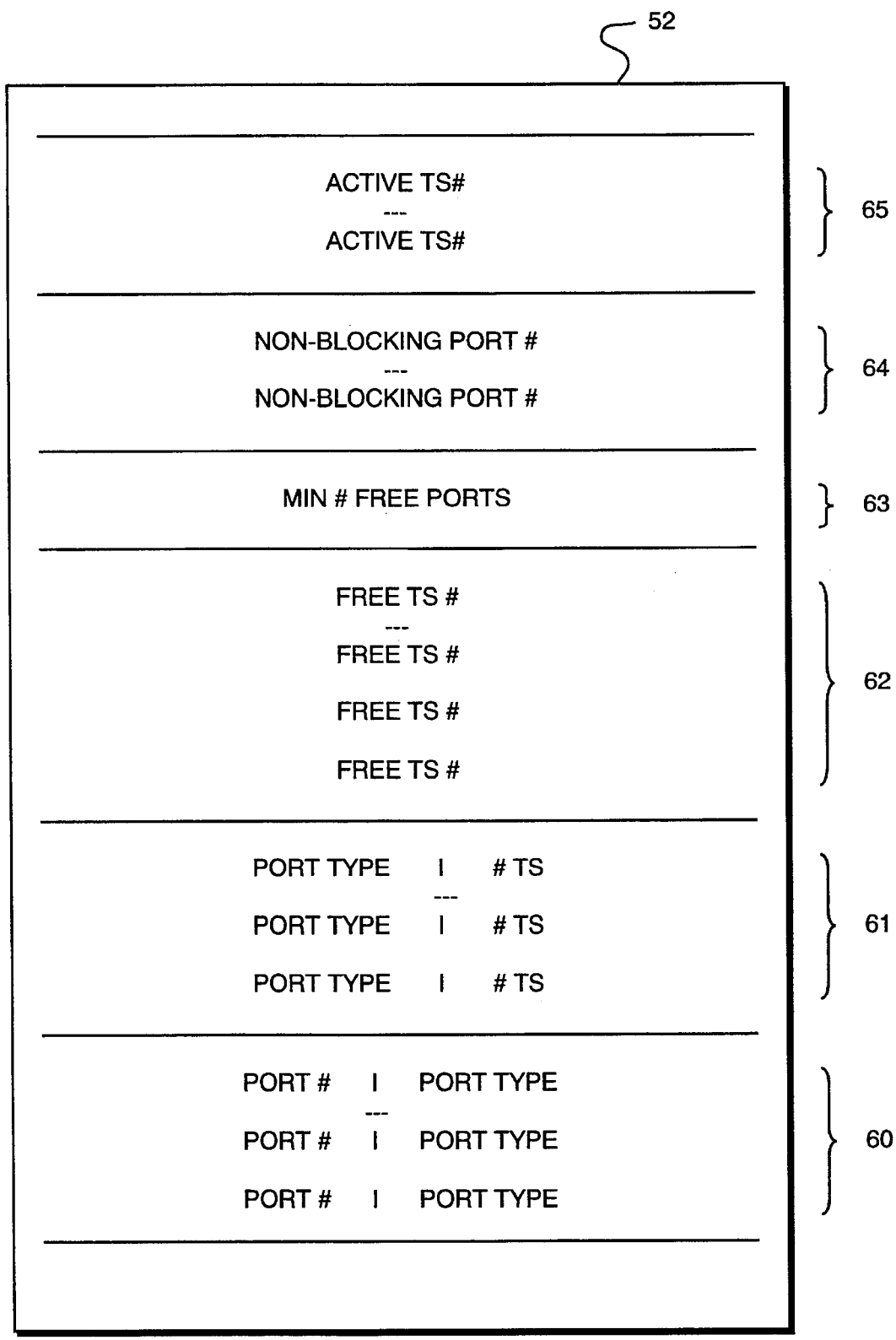
FIG. 2 is a diagram of the contents of a data memory associated with a main central processing unit (CPU) in the switch depicted in FIG. 1.

Referring now to FIG. 2, the main CPU memory 52 maintains information that enables the switch 10 to allocate time slots to the various customer ports 29. A first section of memory contains a port number look-up table 60. This table associates each of the customer ports 29 with a port type. Each customer port 29 is assigned a number, and thus, each entry in the table contains two fields, namely, a port number field 60-1, and a port type indicator field 60-2 The port type indicators are for example, DS0 rate, DS1 rate, and so forth.

A second section of the memory 52 contains a port type look-up table 61 that associates a port type indicator with a number of time slots. Each entry in the port type look-up table 61 includes two fields, namely, a port type indicator field 61-1 and a number of time slots field 61-2. For a given customer port, the main CPU 50 can determine the number of time slots required by first entering the port number look-up table 60, to determine a port type identifier, and then using the identifier to enter the port type look-up table 61, to determine the averaged required number of time slots for the connection. As discussed in more detail below, the switch may later dynamically adjust the number of time slots allocated to a particular connection, as necessary to handle signal traffic.

Other data stored in the memory 52 are used by CPU 50 to assign the time slots to the ports. In particular, a third section 62 of the main memory 52 contains a table of available time slots. A fourth section 63 contains information indicating the minimum number of time slots to be kept free to support "non-blocking" ports, and a fifth section 64 contains is a list of the ports that are configured as non-blocking ports, as well as a minimum number of time slots required by each of these ports. A final section 65 contains a list of "active" time slots, that is, time slots that may be dynamically allocated among the ports, as discussed in more detail below.

Figure 3:
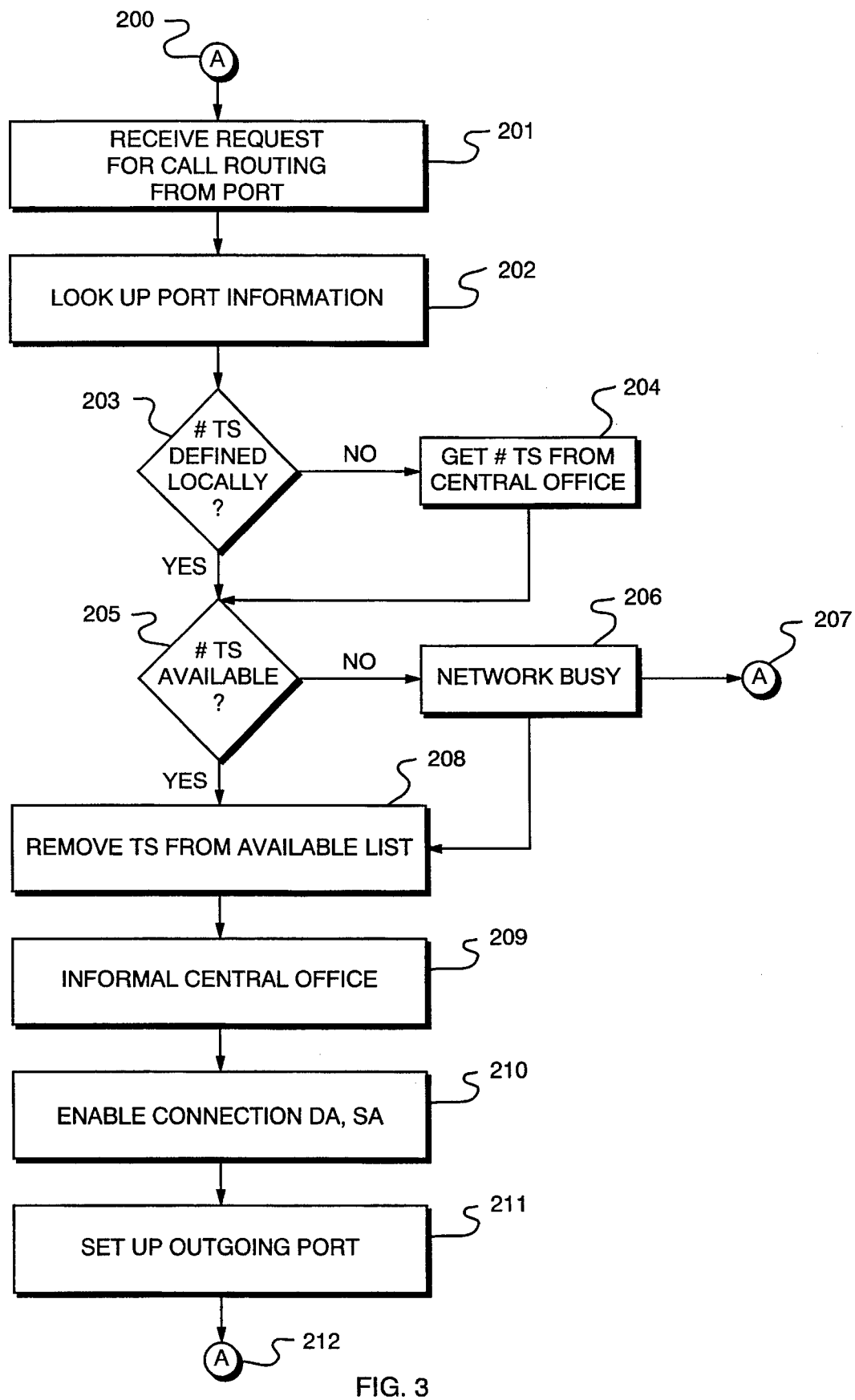
FIG. 3 is a flow chart of the operations performed by the main CPU to route a call, when the bandwidth required by a switch input port remains constant for the duration of the call.

Referring now to FIG. 3 together with FIGS. 1 and 2, we describe a sequence of steps performed by the main CPU 50 to support a port 29 that is configured to transfer voice, video, Multirate ISDN signals, or other calls that utilize a fixed bandwidth for the duration of the call. From an idle state (step 200), the main CPU 50 receives from a port CPU 26 a request that indicates that a call seizure or a call set up signaling message has been received at one of the customer ports 29 (step 201). The CPU 26 is thus requesting access through the switch 10 from the signaling port 29 to a network port 39. As part of the request, the port CPU 26 sends to the main CPU 50 both the port number and the call seizure or call set up information.

The main CPU 50 next examines the information that it maintains for the port in memory 52 (step 202). In particular, it uses the port number to enter the port number look-up table 60. This table returns a port type indicator, which the CPU uses to enter the port type look-up table 61. If the port type is defined therein, the look-up table 61 returns the number of time slots required by the port (step 203). If, for example, the port is a DS0 rate port, the port type look up table 61 specifies one time slot; if the port is a DS1 rate port, the table specifies twenty four time slots; and so forth.

If the call seizure or call set up signaling indicates video or Multirate ISDN, the CPU 50 uses the bandwidth information in the signal and other associated signaling information to determine how many of the time slots available to the port are required by this particular call. Similarly, if the call seizure or call signaling information indicates a teleconference, the CPU 50 determines from this information the required number of time slots.

If for any reason the CPU 50 cannot determine the number of time slots from the information stored in memory 52 or from the call seizure or call setup information, it sends an inquiry to the central office host computer 70, including in the request the port type indicator returned by the port number look-up table 60 (step 204). The central office host computer 70 then returns to the CPU 50 information that allows the CPU 50 to determine the required number of time slots for the port.

The main CPU 50 next examines the list of available time slots 62, to determine if the indicated number of time slots are available (step 205). If they are not then available, the main CPU 50 informs the port CPU 26 that the network is busy (step 206), and the main CPU 50 returns to other switch operations or to an idle state, as appropriate (step 207).

If the time slots are available, CPU 50 removes the appropriate number of time slots from the list of available time slots 62 (step 208). It then informs the central office host computer 70 that the switch 10 is able to accommodate the call (step 209). The CPU 50 next makes a connection through the switch 10 by assigning to the time slots an appropriate source address SA (steps 210), using source address generator 53. The generator then writes to an appropriate location or locations in its memory the applicable source address.

The CPU 50 next sends appropriate instructions to the network port module 33 that is associated with the network line 39 to which the call is to be routed. The connection is completed by assigning to the time slot, as a destination address, the address of the appropriate network port 39 (steps 210–211). The main CPU 50 then returns to other switch operations or to an idle state, as appropriate (step 212).

It is possible that a customer port 29 may be denied access through the switch, because there are not enough available time slots to route the call. To prevent this, non-blocking options may be included in the programming of the main CPU 50.

As discussed above, the CPU 50 may treat as non-blocking ports a desired number of customer ports and/or various types of customer ports. Each time the system is configured, the service provider determines for each of these non-blocking ports the number of time slots required to support the maximum capacity of the port. This information is then stored in the sections 63 and 64 of main memory 52. Section 63 specifies the minimum number of time slots that must be kept free to ensure that these ports always have available to them a required number of time slots. Section 64 identifies the ports.

Figure 4:
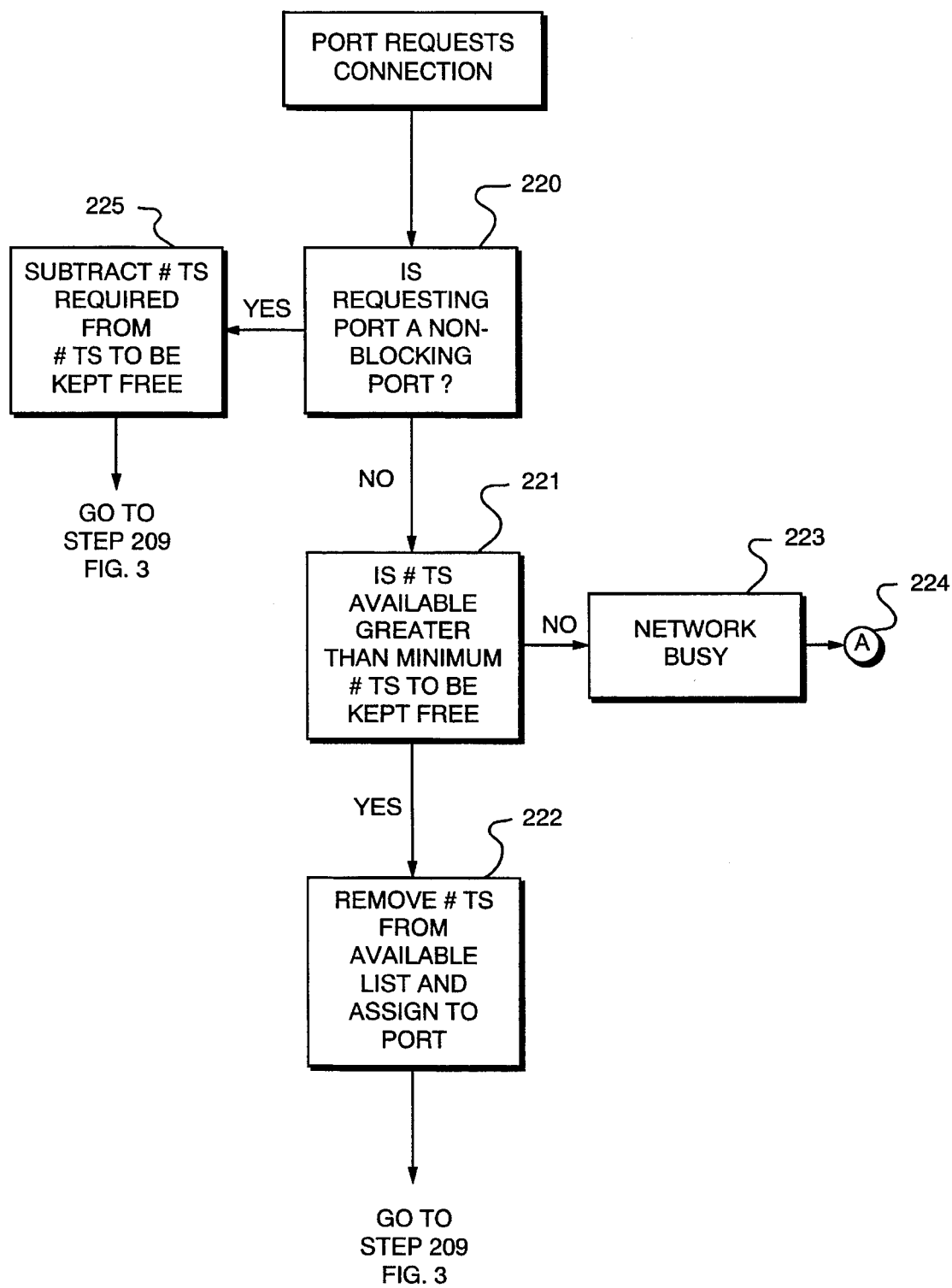
FIG. 4 is a flow chart of the operations performed by the main CPU to route calls involving non-blocking ports.

Referring now to FIG. 4, we discuss the operations of the CPU 50 when certain ports are designated as non-blocking ports. When the main CPU 50 receives a request for connection from CPU 26, the main CPU 50 first determines if the port 29 requesting connection is a non-blocking port (step 220). If not, the CPU 50 compares the number of available time slots in section 62 of memory 52 with the minimum number required to be kept free listed in section 63 of memory 52 (step 221). If the number of available time slots exceeds the number to be kept free by at least the number of time slots required to service the call, the CPU 50 removes the requested number of slots from the available list and assigns them to the port (step 222). It then continues to make the connection as described above with reference to FIG. 3. Otherwise, the CPU 50 informs the CPU 26 that the network is busy (step 223). The CPU 50 then returns to other switch operations or to an idle state, as appropriate (step 224).

If the requested connection is for a non-blocking port, the CPU 50 subtracts the number of time slots allocated to the port from the number to be kept free and updates memory section 63 (step 225). It then continues to make the connection as described above with referenced to FIG. 3.

Figure 5:
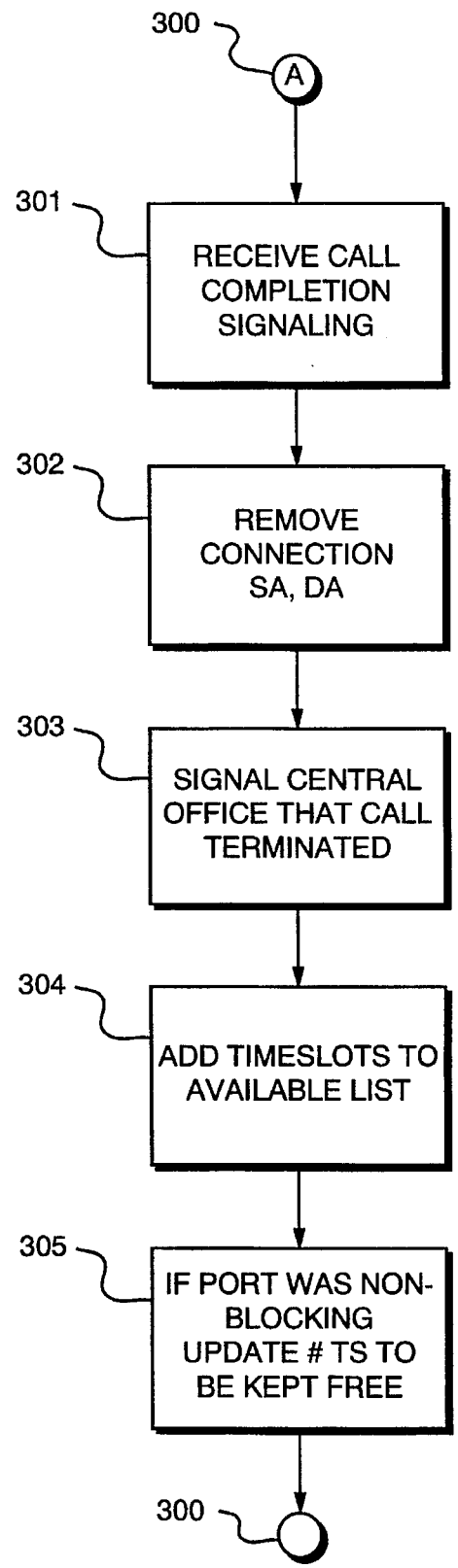
FIG. 5 is a flow chart of the operations performed by the main CPU upon completion of a call.

Turning now to FIG. 5, we describe a sequence of steps executed by the main CPU 50 when it removes (takes down) a connection through the switch 10. From an idle state (step 300), the CPU 50 receives a message indicating that a call completion signal, for example, a hang up signal, has been received on one of the ports 29 or 39 (step 301). The CPU 50 then disables the connection by writing to the memories of source address generator 53 and destination address generator 54, as applicable, a value that indicates that the associated time slots are no longer busy (step 302). The main CPU 50 also notifies the central office host computer 70 that the call is terminated and adds the associated time slots to the list 62 of available time slots (step 303–304). If the call was through a non-blocking port, the CPU 50 also updates memory section 63 to increase the number of time slots to be kept free (step 305). The CPU 50 then returns to other switch operations or to an idle state, as appropriate (step 306).

Using time slots as a resource, it can now be understood how the switch 10 dynamically accommodates bandwidth changes at the customer ports 29. For example, in the morning the switch 10 receives at a customer port 29 a call seizure or call setup signal that indicates a DS0 rate voice signal. The switch then allocates to the port a single time slot, and connects this port to a network port 39 that is connected, for example, to an MCI long distance voice rate line. Later in the day, the call seizure or setup signaling received at the port indicates a video teleconference. The switch then allocates to the port the five time slots that are necessary to complete the connection. Also, an appropriate connection is made to one or more of the network ports 39, such as to a port that connects to a AT&T fractional T1 connectivity service subscribed to by the customer. The routing of the teleconference call to the AT&T service can occur at the request of the customer. Alternatively, it can occur because control circuitry 58, in the switch controller 45, operating in a conventional manner determines that the connection is the best available to handle the call.

The switch 10 also handles data transfers, both synchronous and asynchronous. In a first embodiment, the data transfer connections are made following the procedures discussed above with reference to FIG. 3. For data services, however, the customer may contract with the service provider for a range of bandwidth, paying only for what it actually uses. For these customers, the CPU 50 allocates a predetermined minimum number of time slots to a connection. Then either the CPU 50 or the CPU 26 monitors the connection, to determine if additional time slots should be allocated to it. The CPU 50 can allocate to the connection a number of time slots up to the maximum limit set forth in the service contract. The operations of the CPU 50 and the CPU 26 to route such data transfers through the switch are discussed in more detail below with reference to FIGS. 7 and 8.

Figure 6:
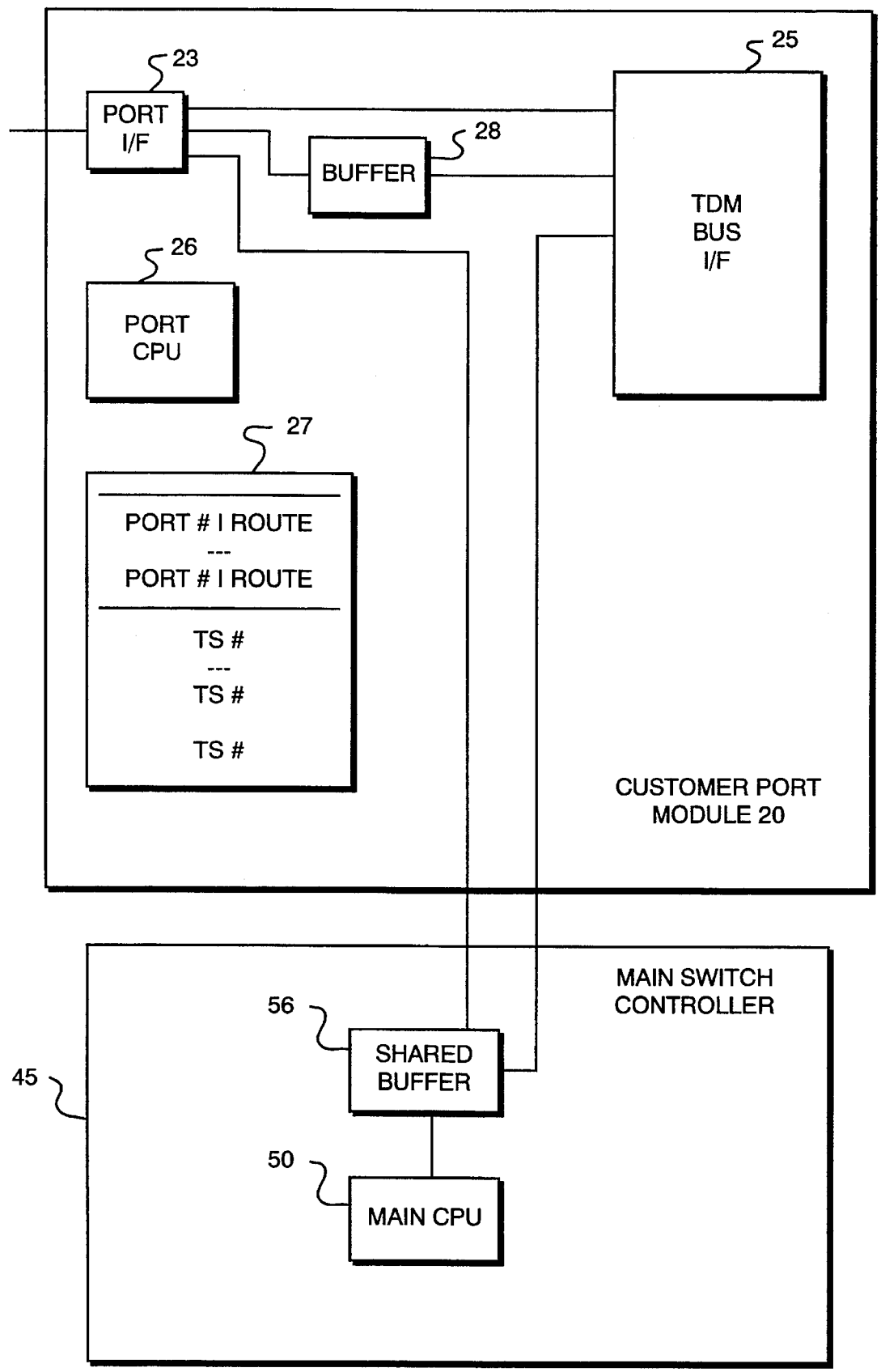
FIG. 6 is a block diagram of a portion of the switch of FIG. 1 that is used to support data services, including frame relay or other switched services, where the bandwidth required by an input port may change during the duration of a call.

Referring now to FIG. 6, a module 20 that handles data transfers includes a buffer 28 disposed between an associated customer port 29 and the TDM bus interface 25. This buffer handles data that cannot be immediately transferred to the TDM bus 40, because of data aggregation performed at the switch or because a time slot is not then available for the data. The port module also includes in its memory 27 routing information for some or all of the customer ports. In an alternative configuration, a shared buffer 56 resides in the switch controller 45. This buffer 56 operates under the control of the main CPU 50. Network port modules 30 (FIG. 1) may also include buffers associated with one or more of the ports.

Figure 7:
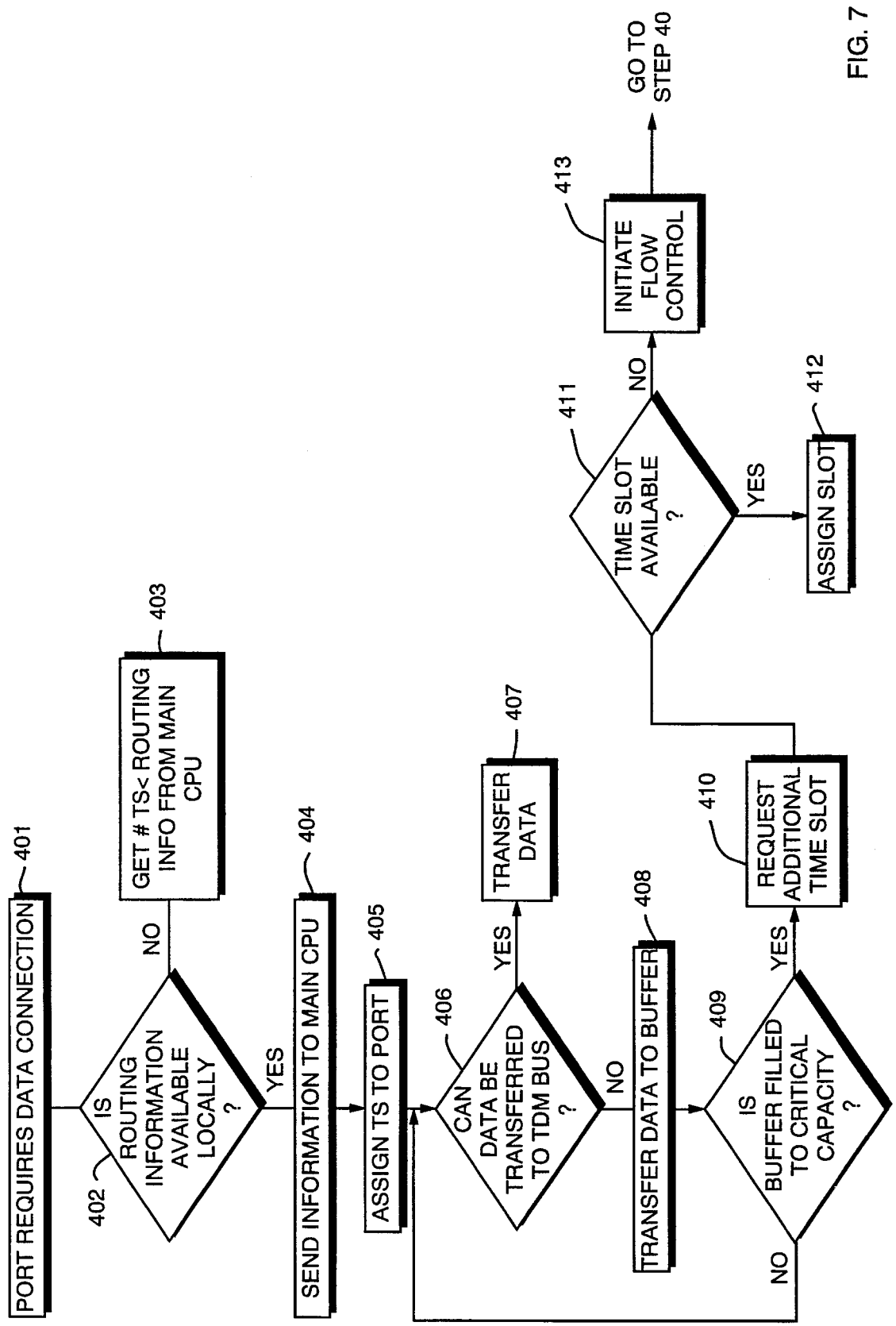
FIG. 7 is a flow chart of the operations performed by the main CPU and a port CPU to support data services connections.

Referring now to FIG. 7 together with FIGS. 1 and 6, we discuss the routing of a data transfer through the switch 10. When a customer port 29 notifies the port CPU 26 that it requires a data connection, the CPU 26 determines if routing information for that port is available from memory 27 (steps 401–402). If the routing information is available, the CPU 26 sends this information along with the call seizure or call set up information to the CPU 50 (step 404). The CPU 50 then follows the procedures discussed above with reference to FIG. 3, and assigns the required minimum number of time slots to the call (step 405). If routing information is not available, CPU 26 sends the call seizure or call set up information to the CPU 50 along with a request for routing information (step 403).

When data arrives at the port 29, the CPU 26 determines if the data can be transferred to the TDM bus interface 25 for immediate transfer to the TDM bus 40 or if the data should be transferred instead to the buffer 28 (steps 406–408). If the data is sent to the buffer 28, the CPU 26 monitors the buffer to determine if the data fills the buffer to above a predetermined critical capacity (step 409). This predetermined critical capacity is below full but represents a point where a next data transfer to the port may fill the buffer or may exceed the buffer's capacity.

As long as the contents of the buffer remain below this predetermined capacity, the CPU 26 continues to transfer data to the buffer 28, and from the buffer to the TDM bus interface 25 as time slots assigned to the port are available. If the contents of the buffer reach the critical capacity, the CPU 26 sends a request to the CPU 50 for an additional time slot (step 410). The CPU 50 then checks its memory section 65 to determine if it has a time slot then available for dynamic allocation. The CPU 50 also checks that the port 29 has not been assigned its maximum number of time slots. If a time slot is available and the port is not at its maximum allocation, the CPU 50 allocates another time slot to the port. The CPU 26 then continues to transfer data to the buffer 28 and from the buffer 28 to this newly allocated time slot and also to the previously allocated time slot. As necessary, the CPU 26 requests further additional time slots, and continues to transfer the data. When the buffer contents fall below a predetermined lower level, the CPU 26 may relinquish to the CPU 50 one or more of the additional time slots. The CPU 50 may then dynamically re-allocate these time slots, as needed.

If an additional time slot is not then available, the appropriate data flow control services mechanisms are then initiated by the CPU 26 (step 413). For example, if the service is a frame relay service, so-called FECN and BECN bits may be asserted to indicate to the frame relay source that data may have been lost and/or that the source should temporarily slow its data transfer rate. The CPU 26 then continues to transfer data to the bus interface 25 and the buffer 28, as appropriate. When the contents of the buffer fall below the predetermined critical capacity, the CPU 26 essentially executes the appropriate data flow control service mechanisms to remove that control. In our example, the CPU 26 executes the flow control mechanisms that deassert the FECN and BECN bits. The CPU 26 then continues to transfer data to the buffer 28 and the TDM bus interface 25, as appropriate. If the data is instead transferred to the shared buffer 56 under the control of the CPU 50, the CPU 50 monitors this buffer to determine when to allocate additional time slots to the connection and/or when to initiate the data flow control service mechanisms.

The switch 10 thus dynamically allocates to a connection the time slots required to support the signal traffic over the connection, within the limits of a customer's service contract. Accordingly, the customer has a high-speed connection when it needs it and does not tie-up time slots unnecessarily or pay for unused bandwidth.

In an alternative embodiment, the module 20 has the ability to handle data transfers with a minimum of oversight from the CPU 50. A customer module 20, at system configuration or reconfiguration, or when the module 20 requests a connection, may be allocated a predetermined number, or pool, of time slots. The module 20 stores in a table in memory 27 a list of these time slots. The predetermined number may be, for example, the minimum number of time slots required to service all of the module's ports or it may be some percentage of the total time slots available to the customer.

Figure 8:
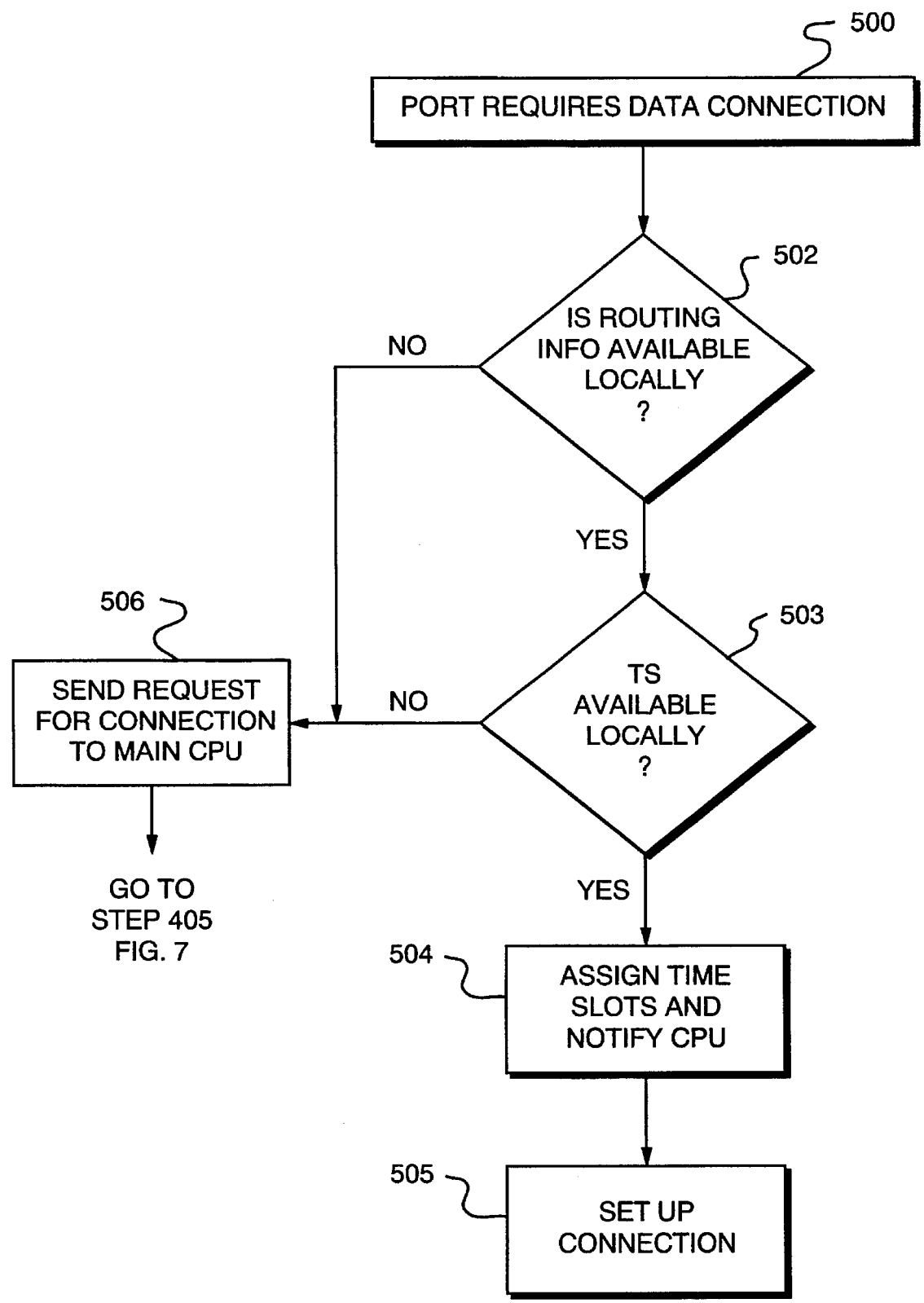
FIG. 8 is a flow chart of alternative operations performed the by the main CPU and the port CPU.

Referring now to FIG. 8 in combination with FIGS. 1 and 6, we describe how the CPU 26 allocates the pooled time slots. When the CPU 26 receives a request for a connection, the CPU 26 determines if it has routing information for the requesting port in its memory 27 (steps 500–502). If so, the CPU 26 checks its allocation table to determine if it has available the required number of time slots and if the time slots can be allocated to this connection (step 503). If so, the CPU 26 assigns that number of time slots to the connection and notifies the CPU 50 of the assignment (step 504). The CPU 50 then assigns the appropriate source and destination addresses to the slots (step 505). The CPU 50 thus does not have to go to its memory 52 to set up the connection. Accordingly, a minimal amount of the CPU 50's resources are used to make the connection, and the CPU 50 is then free to handle requests from the other modules 20. Also, it reduces the traffic on the communication bus between the two CPUs. Thus the communication bus need not be particularly fast, to avoid slowing down the dynamic allocation operations.

If the routing information is not available at the module 20, or if the module does not have any of its allocated time slots available, the CPU 26 sends a request for connection to the CPU 50, following the procedures described above with reference to FIG. 7 (step 506).

Once time slots are assigned, the CPU 26 monitors the data transfers through the port, checking the status of the buffer 28 at the port and assigning additional time slots to the port from its list of available time slots, as needed (step 504).

The switch 10 can readily accommodate transfers to "committed information rate" services and handle surges in these transfers, without losing data. Committed information rate services include, for example, frame relay services, packet switched services and so forth. Committed information rate services essentially guarantee a data transfer rate over a particular connection. Since it is not known in advance how the actual data rate will change during a given call, problems can occur in prior known systems. Often, the mean data transfer rate is equal to the guaranteed rate—with data surges and slow downs occurring at various times. Prior known systems, which cannot dynamically allocate bandwidth to the connection, cannot accommodate the surges. Accordingly, a customer's data may be lost.

Using the switch 10, the CPU 50 allocates to a port with a committed information rate line a number of time slots that accommodate the guaranteed rate. Unlike the prior art, however, the switch buffers data that is sent at a faster rate. As necessary, the switch dynamically allocates to the connection additional time slots, for example, another line, to handle data surges that continue over a longer time period than the buffer can accommodate. Before such an allocation the main CPU 50 contacts the host computer 70 to determine if the customer's service contract permits the customer to have more bandwidth over this connection. If so, the CPU 50 follows the procedures discussed above, and allocates to the port the additional time slots.

Figure 9:
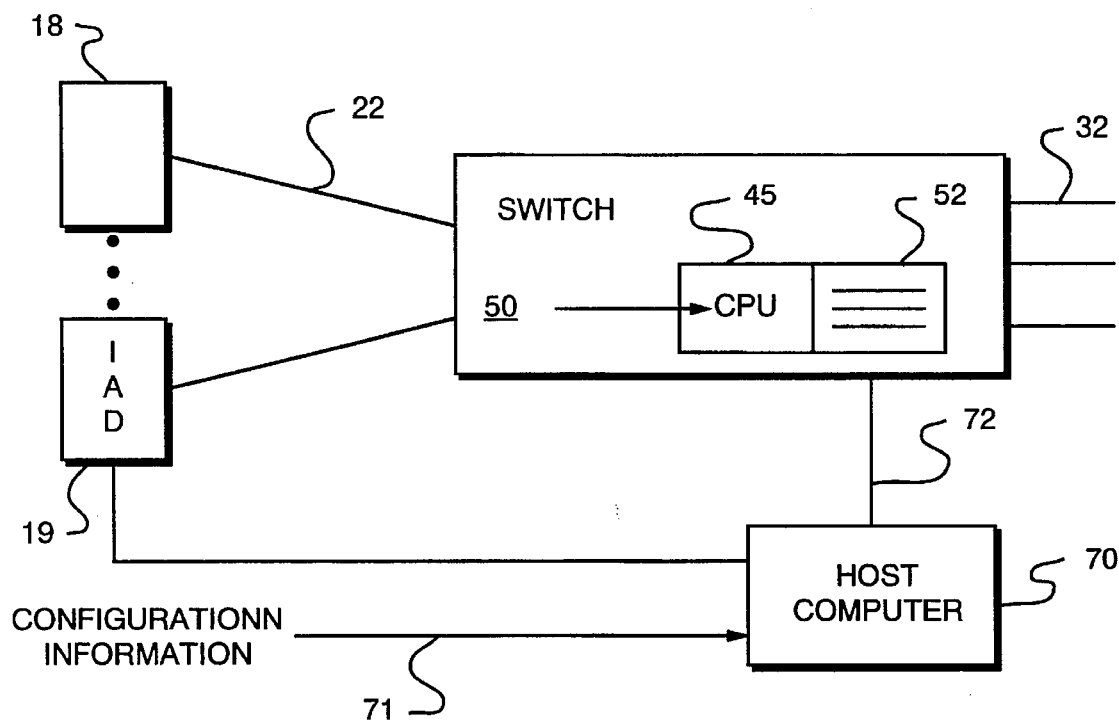
FIG. 9 is a block diagram depicting in more detail a customer's connection to the switch of FIG. 1.

Referring now to FIG. 9, a customer may send a request for system reconfiguration to the service provider's host computer 70 over a conventional telephone line 71. The customer thus dials a telephone number which makes available to the customer a menu from which the customer can selectively change the connections through the switch. Once the customer makes its selections from the menu, the host computer communicates with CPU 50, over a control channel that is typically used to send status information to the host computer, to instruct CPU 50 to make the necessary changes to its memory 52 and, as necessary, to the customer port module memories 27. The CPU 50 thus updates its port number look-up table 60 and its port type look-up table 61 (FIG. 1) appropriately, and instructs the CPUs 26 to update the routing information.

Before reconfiguring the switch, the host computer 70 first determines that the customer's service contract supports such a reconfiguration. The customer may, for example, request that a particular port that is connected to a voice network be connected instead to a frame relay service, so that the customer can send data to another location at high-speeds. As long as the customer subscribes to the service, the host computer and CPU 50 perform the necessary procedures to reconfigure the switch.

Figure 10:
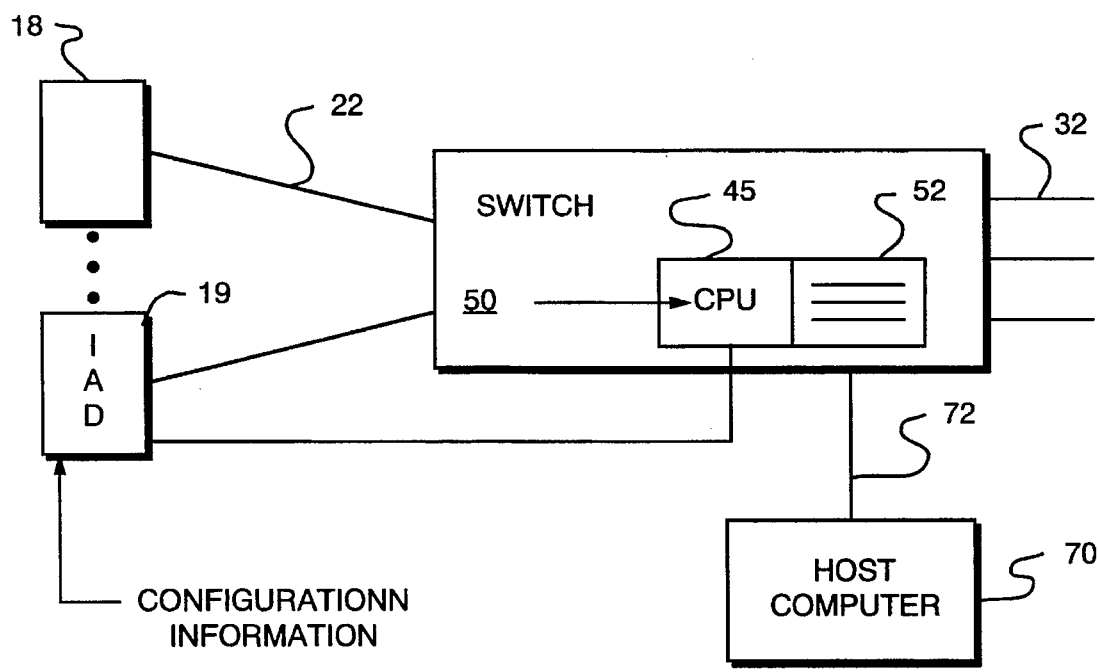
FIG. 10 is a block diagram depicting an alternative connection to the switch of FIG. 1.

Referring now to FIG. 10, the customer can initiate a switch reconfiguration by sending configuration information directly to its IAD 19. The IAD then communicates with the switch 10, over the control channel, to inform the switch of the desired reconfiguration. The switch contacts the service provider's host computer 70, again over the control channel, to initiate the requested reconfiguration.

While we have shown and described several embodiments in accordance with the present invention, it is to be understood that the invention is not limited thereto, but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A telephone switching system including:

a time division multiple access bus;

at least one customer port module, the customer port module coupled to receive a number of telephone signals on a plurality of customer ports, and to provide the telephone signals to the time division multiple access bus, and further coupled to receive telephone signals from the time division multiple access bus and to provide the telephone signals at the plurality of the customer ports;

at least one network port module, the network port module coupled to receive a number of telephone signals from a telephone network on a plurality of network ports, and to provide the telephone signals to the time division multiple access bus, and further coupled to receive telephone signals from the time division multiple access bus and to provide the telephone signals to the network on the plurality of network ports; and means for controlling one or more connections between the plurality ports on the customer port modules and the plurality ports on the network port modules, by which any given telephone signal from a particular customer port module may be connected to a port on a network port module, the connections being made by allocating to the connection time slots on the time division multiple access bus; and dynamic allocation means for dynamically allocating the number of time slots to each such connection, by allocating, when a customer port is requesting access to a network port, an appropriate number of time slots required to service the connections aid dynamic allocation means including (i) means for detecting protocols that include in-band signaling information that indicates the bandwidth demand of the port; and (ii) means for determining from the in-band signaling information the number of time slots required to support the bandwidth demand.

2. A telephone switching system including:

a time division multiple access bus;

at least one customer port module, the customer port module coupled to receive a number of telephone signals on a plurality of customer ports, and to provide the telephone signals to the time division multiple access bus, and further coupled to receive telephone signals from the time division multiple access bus and to provide the telephone signals at the plurality of the customer ports;

at least one network port module, the network port module coupled to receive a number of telephone signals from a telephone network on a plurality of network ports, and to provide the telephone signals to the time division multiple access bus, and further coupled to receive telephone signals from the time division multiple access bus and to provide the telephone signals to the network on the plurality of network ports; and means for controlling one or more connections between the plurality ports on the customer port modules and the plurality ports on the network port modules, by which any given telephone signal from a particular customer port module may be connected to a port on a network port module, the connections being made by allocating to the connection time slots on the time division multiple access bus; and dynamic allocation means for dynamically allocating the number of time slots to each such connection, by allocating, when a customer port is requesting access to a network port, an appropriate number of time slots required to service the connection said dynamic allocating means including (i) means for detecting in-band bonding information concerning the requested type of connection provided within a call originating signal, the bonding information indicating the bandwidth demand of the port; and (ii) means for determining from the in-band bonding information the number of time slots required to support the bandwidth demand.

3. A telephone switching system including:

a time division multiple access bus;

at least one customer port module, the customer port module coupled to receive a number of telephone signals on a plurality of customer ports, and to provide the telephone signals to the time division multiple access bus and further coupled to receive telephone signals from the time division multiple access bus and to provide the telephone signals at the plurality of the customer ports;

at least one network port module, the network port module coupled to receive a number of telephone signals from a telephone network on a plurality of network ports, and to provide the telephone signals to the time division multiple access bus, and further coupled to receive telephone signals from the time division multiple access bus and to provide the telephone signals to the network on the plurality of network ports; and means for controlling one or more connections between the plurality ports on the customer port modules and the plurality ports on the network port modules, by which any given telephone signal from a particular customer port module may be connected to a port on a network port module, the connections being made by allocating to the connection time slots on the time division multiple access bus; and dynamic allocation means for dynamically allocating the number of time slots to each such connection, by allocating, when a customer port is requesting access to a network port, an appropriate number of time slots required to service the connection said dynamic allocation means including means for determining for a customer port (i) a port type and (ii) a required number of time slots associated with the port type wherein the means for determining the customer port type includes a memory for storing port type information that is based on switch configuration.

4. The telephone switching system as in claim 3 wherein the means for determining customer port type includes a means for updating the memory when the switch configuration changes.

5. A telephone switching system as in claim 4 further including means for changing the switch configuration, said means responding to signals relating to switch reconfiguration received over a control channel.

6. A telephone switching system as in claim 3 further including a means for changing the switch configuration, said means responding to customer-initiated requests for switch reconfiguration.

7. A telephone switching system including:

a time division multiple access bus;

at least one customer port module, the customer port module coupled to receive a number of telephone signals on a plurality of customer ports, and to provide the telephone signals to the time division multiple access bus, and further coupled to receive telephone signals from the time division multiple access bus and to provide the telephone signals at the plurality of the customer ports;

at least one network port module, the network port module coupled to receive a number of telephone signals from a telephone network on a plurality of network ports, and to provide the telephone signals to the time division multiple access bus, and further coupled to receive telephone signals from the time division multiple access bus and to provide the telephone signals to the network on the plurality of network ports; and means for controlling one or more connections between the plurality ports on the customer port modules and the plurality ports on the network port modules, by which any given telephone signal from a particular customer port module may be connect to a port on a network port module, the connections being made by allocating to the connection time slots on the time division multiple access bus; and means for dynamically allocating the number of time slots to each such connection, by allocating, when a customer port is requesting access to a network port, an appropriate number of time slots required to service the connection; and means for initiating data flow control service mechanisms to support data services connections, said means initiating the mechanisms when the number of time slots allocated to a connection cannot adequately accommodate the bandwidth demand.

8. A telephone switching system including:

a time division multiple access bus;

at least one customer port module, the customer port module coupled to receive a number of telephone signals on a plurality of customer ports, and to provide the telephone signals to the time division multiple access bus, and further coupled to receive telephone signals from the time division multiple access bus and to provide the telephone signals at the plurality of the customer ports;

at least one network port module, the network port module coupled to receive a number of telephone signals from a telephone network on a plurality of network ports, and to provide the telephone signals to the time division multiple access bus, and further coupled to receive telephone signals from the time division multiple access bus and to provide the telephone signals to the network on the plurality of network ports; and means for controlling one or more connections between the plurality ports on the customer port modules and the plurality ports on the network port modules, by which any given telephone signal from a particular customer port module may be connected to a port on a network port module, the connections being made by allocating to the connection time slots on the time division multiple access bus;

means for dynamically allocating the number of time slots to each such connection, by allocating, when a customer port is requesting access to a network port, an appropriate number of time slots required to service the connection; and a buffer memory, disposed between one or more customer ports and the time division multiple access bus, for buffering data that cannot be immediately transferred to time slots.

9. A telephone switching system as in claim 8 further includes means for initiating data flow control service mechanisms to support data services connections, the means initiating the mechanisms when the buffer memory contents exceed a predetermined critical capacity.

10. A telephone switching system as in claim 8 wherein the means for allocating a number of time slots to each connection includes:

detecting means for detecting, during the progress of a call, a need for additional or lesser bandwidth; and means for dynamically allocating, during the progress of a call, a number of time slots to support that additional or lesser bandwidth.

11. The telephone switching system of claim 10 wherein the detecting means detects a need for additional or lesser bandwidth by monitoring the contents of the buffer memory.

12. A telephone switching system including:

a time division multiple access bus:

at least one customer port module, the customer port module coupled to receive a number of telephone signals on a plurality of customer ports, and to provide the telephone signals to the time division multiple access bus, and further coupled to receive telephone signals from the time division multiple access bus and to provide the telephone signals at the plurality of the customer ports;

at least one network port module, the network port module coupled to receive a number of telephone signal from a telephone network on a plurality of network ports, and to provide the telephone signals to the time division multiple access bus and further coupled to receive telephone signals from the time division multiple access bus and to provide the telephone signals to the network on the plurality of network ports; and means for controlling one or more connections between the plurality ports on the customer port modules and the plurality ports on the network port modules, by which any given telephone signal from a particular customer port module may be connected to a port on a network port module, the connections being made by allocating to the connection time slots on the time division multiple access bus; and dynamic allocation means for dynamically allocating the number of time slots to each such connection, by allocating, when a customer port is requesting access to a network port, an appropriate number of time slots required to service the connection said dynamic allocation means including (i) detecting means for detecting, during the progress of a call, a need for additional or lesser bandwidth; and (ii) means for dynamically allocating, during the progress of a call, a number of time slots to support that additional or lesser bandwidth.

13. A telephone switching system including:

a time division multiple access bus;

at least one customer port module, the customer port module coupled to receive a number of telephone signals on a plurality of customer ports, and to provide the telephone signals to the time division multiple access bus, and further coupled to receive telephone signals from the time division multiple access bus and to provide the telephone signals at the plurality of the customer ports;

at least one network port module, the network port module coupled to receive a number of telephone signals from a telephone network on a plurality of network ports, and to provide the telephone signals to the time division multiple access bus, and further coupled to receive telephone signals from the time division multiple access bus and to provide the telephone signals to the network on the plurality of network ports; and means for controlling one or more connections between the plurality ports on the customer port modules and the plurality ports on the network port modules, by which any given telephone signal from a particular customer port module may be connected to a port on a network port module the connections being made by allocating to the connection time slots on the time division multiple access bus; and dynamic allocation means for dynamically allocating the number of time slots to each such connection, by allocating when a customer port is requesting access to a network port, an appropriate number of time slots required to service the connection said dynamic allocation means including (i) means for determining which of the customer ports are non-blocking; and (ii) means for refraining from allocating to other than a non-blocking port a number of time slots required to service each of the non-blocking ports.

14. A telephone switch for connecting signals from customer premise equipment through one or more ports on a customer port module to one or more ports on a network port module, the switch including:

a time division multiple access bus;

means for controlling one or more connections between the ports on the customer port module and the ports on the network port module, by which any given telephone signal from a particular customer port module may be connected to a port in a network port module, the connections being made by assigning to the connection time slots on the time division multiple access bus; and dynamic allocation means for dynamically allocating the number of time slots assigned to each such connection, by allocating, when a customer port is requesting access to a network port through the switch, an appropriate number of time slots required to service the connection said dynamic allocation means including (i) means for detecting protocols that include in-band signaling information the indicates the bandwidth demand of the port; and (ii) means for determining from the in-band signaling information the number of time slots required to support the bandwidth demand.

15. A telephone switch for connecting signals from customer premise equipment through one or more ports on a customer port module to one or more ports on a network port module, the switch including:

a time division multiple access bus;

means for controlling one or more connections between the ports on the customer port module and the ports on the network port module, by which any given telephone signal from a particular customer port module may be connected to a port in a network port module, the connections being made by assigning to the connection time slots on the time division multiple access bus; and dynamic allocation means for dynamically allocating the number of time slots assigned to each such connection, by allocating, when a customer port is requesting access to a network port through the switch, an appropriate number of time slots required to service the connection said dynamic allocation means including (i) means for detecting in-band bonding information concerning the requested type of connection provided with a call originating signal, the in-band bonding information indicating the bandwidth demand of the port; and (ii) means for determining from the in-band bonding information the number of time slots required to support the bandwidth demand.

16. A telephone switch for connecting signals from customer premise equipment through one or more ports on a customer port module to one or more ports on a network port module, the switch including:

a time division multiple access bus;

means for controlling one or more connections between the ports on the customer port module and the ports on the network port module, by which any given telephone signal from a particular customer port module may be connected to a port in a network port module, the connections being made by assigning to the connection time slots on the time division multiple access bus; and dynamic allocation means for dynamically allocating the number of time slots assigned to each such connection, by allocating, when a customer port is requesting access to a network port through the switch, an appropriate number of time slots required to service the connection said dynamic allocation means including means for determining for a customer port (i) a port type and (ii) a required number of time slots associated with the port type wherein the means for determining customer port type includes a memory for storing port type information that is based on switch configuration.

17. The telephone switch as in claim 16 wherein the means for determining customer port type includes a means for updating the memory whenever the switch configuration changes.

18. A telephone switch as in claim 17 wherein the switch includes means for changing the switch configuration, said means responding to signals relating to switch reconfiguration received over a control channel.

19. A telephone switch as in claim 16 wherein the switch includes means for changing the switch configuration, said means responding to customer-initiated requests for switch reconfiguration.

20. A telephone switch for connecting signals from customer premise equipment through one or more ports on a customer port module to one or more ports on a network port module, the switch including:

a time division multiple access bus;

means for controlling one or more connections between the ports on the customer port module and the ports on the network port module, by which any given telephone signal from a particular customer port module may be connected to a port in a network port module, the connections being made by assigning to the connection time slots on the time division multiple access bus; and dynamic allocation means for dynamically allocating the number of time slots assigned to each such connection, by allocating, when a customer port is requesting access to a network port through the switch, an appropriate number of time slots required to service the connection said dynamic allocation means including (i) means for detecting, during the progress of a call, a need for additional or lesser bandwidth; and (ii) means for dynamically allocating, during the progress of a call, a number of time slots to support that additional or lesser bandwidth.

21. A telephone switch for connecting signals from customer premise equipment through one or more ports on a customer port module to one or more ports on a network port module, the switch including:

a time division multiple access bus;

means for controlling one or more connections between the ports on the customer port module and the ports on the network port module, by which any given telephone signal from a particular customer port module may be connected to a port in a network port module, the connections being made by assigning to the connection time slots on the time division multiple access bus; and dynamic allocation means for dynamically allocating the number of time slots assigned to each such connection, by allocating, when a customer port is requesting access to a network port through the switch, an appropriate number of time slots required to service the connection said dynamic allocation means including (i) means for determining which of the customer ports are non-blocking; and (ii) means for reserving a number of time slots required to service each of the non-blocking ports for which the control means has not made a connection.

22. A method of connecting signals from a customer port on a customer port module to a network port on a network port module, the method including the steps of:

A. receiving at a customer port module signals that indicate a connection request to a network port module;

B. determining a bandwidth demand for the port requesting the connection;

C. dynamically allocating to the requesting port a number of time slots required to meet the bandwith demand including
  a. determining a port type for the requesting port;
  b. determining a required number of time slots to service the port;
  c. determining if the requesting port is a non-blocking port;
  d. if the port is a non-blocking port, allocating to the port the required number of time slots;
  e. if the port is not a non-blocking port, determining if the required number of time slots are available and do not reduce the number of available time slots below the number required to service the non-blocking ports, and if such time slots are available allocating the time slots to the port;
  f. if such time slots are not available informing the port that the network is busy; and D. establishing a connection between the requesting port and a network port.

23. The method of connecting signals from a customer port on a customer port module to a network port on a network port module of claim 22, wherein the step of determining if time slots are available further includes the steps of:

v. comparing a number of time slots required to be kept free for the non-blocking ports with a number of available time slots;

vi. determining if the number of time slots available exceeds the number of time slots required to be kept free by a number of time slots that is equal to or exceeds the number of time slots required by the requesting customer port;

vii. if so, assigning the required number of time slots to the requesting port and viii. if not, refraining from assigning the time slots to the requesting port.

24. A method of connecting signals from a customer port on a customer port module to a network port on a network port module, the method including the steps of:

A. receiving at a customer port module signals that indicate a connection request to a network port module;

B. determining a bandwidth demand for the port requesting the connection by a. detecting protocols that include in-band signaling information that indicates the bandwidth demand of the requesting port; and b. determining from the in-band signaling information the number of time slots required to support the bandwidth demand;

C. dynamically allocating to the requesting port a number of time slots required to meet the bandwidth demand; and D. establishing a connection between the requesting port and a network port.

25. A method of connecting signals from a customer port on a customer port module to a network port on a network port module, the method including the steps of:

A. receiving at a customer port module signals that indicate a connection request to a network port module;

B. determining a bandwidth demand for the port requesting the connection by a detecting in-band bonding information concerning the requested type of connection provided within a call originating signal; and b. determining from the in-band bonding information the number of time slots required to support the bandwidth demand;

C. dynamically allocating to the requesting non a number of time slots required to meet the bandwidth demand; and D. establishing a connection between the requesting port and a network port.

26. A method of connecting signals from a customer port on a customer port module to a network port on a network port module, the method including the steps of:

A. receiving at a customer port module signals that indicate a connection request to a network port module;

B. determining a bandwidth demand for the port requesting the connection

C. buffering data from a port until an appropriate number of time slots can be allocated to the connection;

D. dynamically allocating to the requesting port a number of time slots required to meet the bandwidth demand; and E. establishing a connection between the requesting port and a network port.

27. The method of connecting signals from a customer port on a customer port module to a network port on a network port module of claim 26 further including the steps of:

detecting, during the progress of a call, a need for additional or lesser bandwidth; and dynamically allocating, during the progress of a call, a number of time slots to support the additional or lesser bandwidth.

28. The method of connecting signals from a customer port on a customer port module to a network port on a network port module of claim 27, wherein the step of detecting a need for additional or lesser bandwidth includes detecting when the contents of the buffer exceed a predetermined maximum capacity level or fall below a predetermined minimum capacity level, respectively.

* * * * *